(12) United States Patent
Yu

(10) Patent No.: US 6,416,415 B1
(45) Date of Patent: Jul. 9, 2002

(54) SYMMETRICAL JOINT STRUCTURE FOR PHYSICAL MATTER CONNECTION

(76) Inventor: Qi Yu, 15332 E. Valley Blvd., City of Industry, CA (US) 91745

( * ) Notice: Subject to any disclaimer, the term of this patent is extended or adjusted under 35 U.S.C. 154(b) by 0 days.

(21) Appl. No.: 09/808,687

(22) Filed: Mar. 14, 2001

(51) Int. Cl.[7] .............................. F16D 1/02; B25G 3/08
(52) U.S. Cl. .......................... 464/42; 403/364; 403/13; 464/137
(58) Field of Search ..................... 403/364, 13; 464/42, 464/137, 157, 149

(56) References Cited

U.S. PATENT DOCUMENTS

| | | | | |
|---|---|---|---|---|
| 1,241,118 A | * | 9/1917 | Hoskins | 464/106 |
| 1,528,432 A | * | 3/1925 | Kay | 464/157 |
| 1,865,300 A | * | 6/1932 | Bowen | 464/106 |
| 2,470,282 A | * | 5/1949 | Baker et al. | 33/245 |
| 2,617,278 A | * | 11/1952 | Sindelar | 464/106 |
| 4,280,339 A | * | 7/1981 | Stuemky | 464/157 |
| 4,840,601 A | * | 6/1989 | Denman | 464/157 |
| 5,183,409 A | * | 2/1993 | Clever et al. | 439/291 |
| 5,545,091 A | * | 8/1996 | Hoskins et al. | 464/157 |

* cited by examiner

Primary Examiner—Lynne H. Browne
Assistant Examiner—Kenn Thompson
(74) Attorney, Agent, or Firm—Raymond Y. Chan; Divid and Raymond Patent Group

(57) ABSTRACT

A symmetrical joint structure for integrally joining a first joint element and a second joint element together, wherein the first joint element has a first joint portion and the second joint element has a second joint portion for intercrossedly joined with the first joint portion. Each of the first and second joint portion has two semi-conical engagement tongues fittingly engaged in two semi-conical engagement grooves of the other joint portion respectively, so as to integrally united the first joint portion and the second joint portion together to form the symmetrical joint structure.

25 Claims, 7 Drawing Sheets

SYMMETRICAL JOINT STRUCTURE FOR PHYSICAL MATTER CONNECTION

BACKGROUND OF THE PRESENT INVENTION

1. Field of Invention

The present invention relates to a connection structure, and more particularly to a symmetrical joint structure for connecting two physical matters together to form a strong and integral body that minimizes the stress of the connecting parts thereof.

2. Description of Related Arts

Joint structure is the most common way to connect two physical matters together in various fields such as mechanical structure, civil construction, biological engineering, and etc. All building constructions need to connect beams end to end coaxially. Transmission shaft is generally made by coaxially connecting two axles end to end together. Any beam made of two or more kinds of material also need to connect sections together through joint structure. Even a branch can be coaxially joined with another branch of another species to form a new species.

FIG. 1A illustrates a most common joint A for connecting two ends A11, A21 of two beams A1, A2 coaxially together, wherein a radial slot A12 is formed at one end A11 of the first beam A1 while a narrowed latch A22 is formed at one end A21 of the second beam A2. By fittedly inserting the latch A22 into the slot A12, the second beam A2 can be joined with the first beam A1 to form an elongated beam.

FIG. 1B illustrates another common joint B for connecting two ends B11, B21 of a first and a second beam B1, B2 coaxially together, wherein each end B11, B21 of the first and second beams B1, B2 forms a semi-circular latch B12, B22, so that by overlappingly connecting the two semi-circular latches B12, B22 together, the first and second beams B1, B2 can also be joined to form an elongated beam.

FIG. 1C illustrates another common joint C for connecting two ends C11, C21 of a first and a second beam C1, C2 coaxially together, wherein a central latch C12 is formed at one end C11 of the first beam C1 while a central hole C22 is formed at one end C21 of the second beam C2. By fittedly inserting the central latch C12 into the central hole C22, the second beam C2 can be joined with the first beam C1 to form an elongated beam.

FIG. 1D illustrates one more common joint D for connecting two ends D11, D21 of first and a second beam D1, D2 coaxially together, wherein a connecting ring D12, D22 is formed at each end D11, D21 of the two beams D1, D2. By connecting the two connecting rings D12, D22 together, the first and the second beams D1, D2 can be coaxially connected together to form an elongated beam.

However, when a torque is applied to each of such elongated beams as disclosed above, the high intensity stress formed at those connecting parts, such as the connecting corners of the latch A22 and slot A12, the two semi-circular latches B12, B22, the central latch C12 and the central hole C22, and the two connecting rings D12, D22, would weaken the joint A, B, C, or D. Moreover, if the first beam A1, B1, C1, or D1 is a driving axle and the second beam A2, B2, C2, or D2 is a driven axle, friction will form between all contacting flat surfaces.

Like a two-piece golf ball, when a spherical core is required to be constructed by joining two semi-spherical halves E1, E2 together to form a spheroid E, as shown in FIG. 2, the biggest problem is how to minimize the friction and torque formed therebetween during rotation and impact. Even applying extra strong adhesive between the two attaching surfaces, such combined spheroid E is still weak for torque.

SUMMARY OF THE PRESENT INVENTION

The main objective of the present invention is to provide a symmetrical joint structure for physical matter connection, wherein two identical joint portions of two objects can be united together with minimum friction between the contacting surfaces and minimized stress occurred at the connecting joint portions.

Another objective of the present invention is to provide a symmetrical joint structure which can be apply for constructing a spheroid by two symmetrical pieces while minimizing the friction between all contacting surfaces and the stress of all connecting portions during rotation and impact.

Another objective of the present invention is to provide a symmetrical joint structure which can apply for joining two ends of two beams coaxially together while minimizing the friction between all contact surfaces and the stress of all connecting portions.

Another objective of the present invention is to provide a symmetrical joint structure, wherein the two joint portions of two physical matters are symmetrically identical that each provides a curved and smooth joint surface so as to enable the two joint portions to fittingly engage with each other integrally.

Another objective of the present invention is to provide a symmetrical joint structure adapted for perfectly and firmly connecting two physical matters together in such a manner that the united physical matters cannot be separated in all direction except separating the two physical matters coaxially apart, so that the symmetrical joint structure is good for power transmission that, for example, if one of the physical matters is a driving object and the other physical matter is a driven object, the rotation of the driving object can be completely transmitted to the driven object and drive it to rotate accordingly.

In order to accomplish the above objectives, the present invention provides a symmetrical joint structure for integrally joining a first joint element and a second joint element together;

wherein the first joint element has a first joint portion which comprises two identical first semi-conical engagement tongues symmetrically projecting at two sides thereof so as to define two identical first semi-conical engagement grooves symmetrically indented between the two first semi-conical engagement tongues, wherein the two first semi-conical engagement tongues respectively define two first conically curved tongue surfaces symmetrically facing with each other, and the two first semi-conical engagement grooves respectively define two first conically curved groove surfaces symmetrically and continuously extended between the two first conically curved tongue surfaces so as to form a continuous first joint surface for the first joint portion;

wherein the second joint element has a second joint portion which comprises two identical second semi-conical engagement tongues symmetrically projecting at two sides thereof so as to define two identical second semi-conical engagement grooves symmetrically indented between the two second semi-conical engagement tongues, wherein the two second semi-conical engagement tongues respectively define two second conically curved tongue surfaces symmetrically facing with each other, and the two second semi-conical engagement grooves respectively define two second conically curved groove surfaces symmetrically and continuously extended between the two second conically curved tongue surfaces so as to form a continuous second joint surface for the second joint portion;

wherein a cone height of each of the first and second semi-conical engagement tongues is equal to a cone height of each of the first and second semi-conical engagement grooves, and thus the size and shape of the first joint portion and the second joint portion are identical and symmetrical, wherein the two second semi-conical engagement tongues are fittingly engaged in the two first semi-conical engagement grooves respectively while the two first semi-conical engagement tongues are fittingly engaged in the two second semi-conical engagement grooves respectively, so as to integrally united the first joint portion and the second joint portion together to form the symmetrical joint structure.

DETAILED DESCRIPTION OF THE PREFERRED EMBODIMENT

Figures 1A, 1B, 1C:
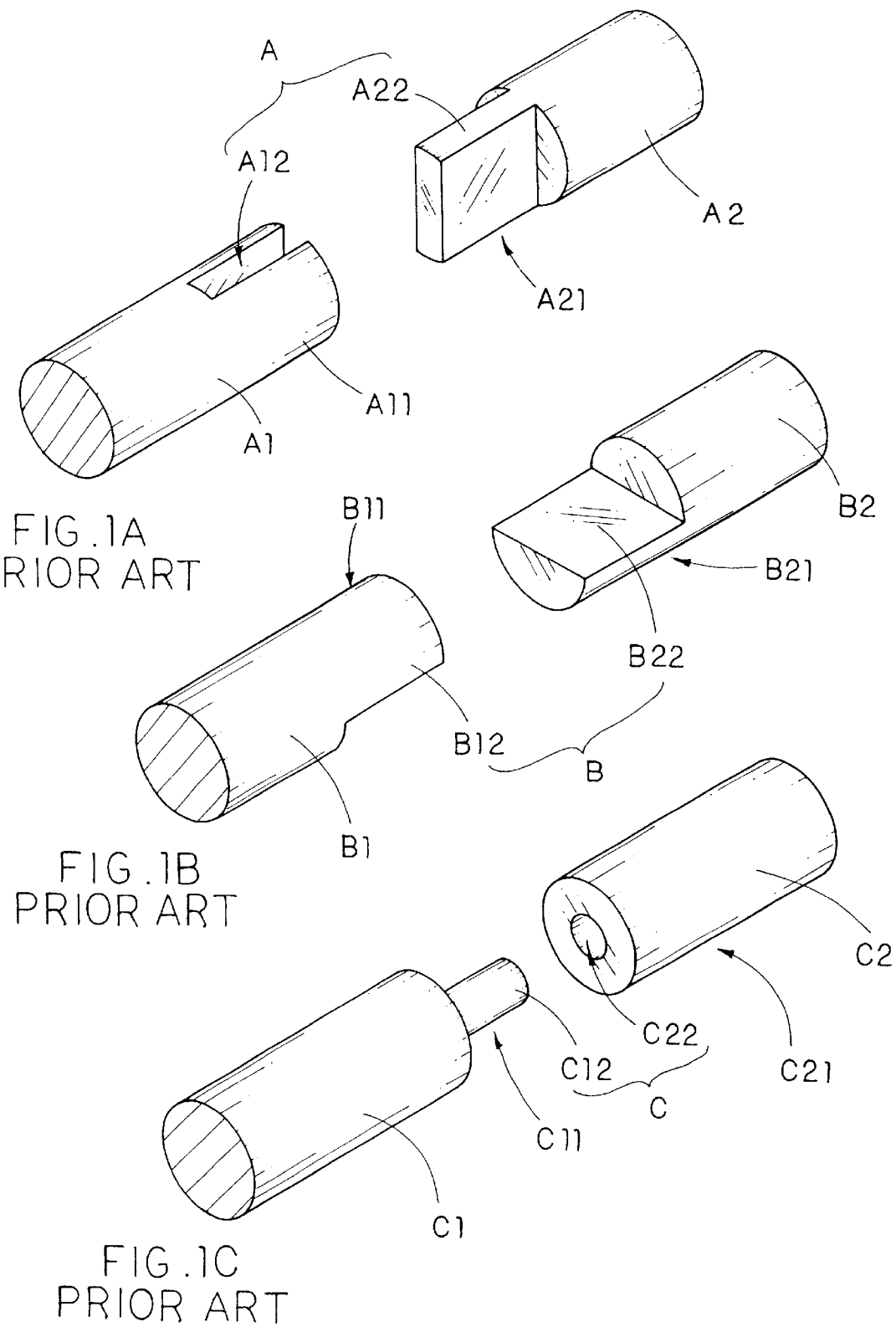
FIGS. 1A to 1D are perspective views illustrating four conventional joint structure for connecting two beams end to end coaxially.
Figure 1D:
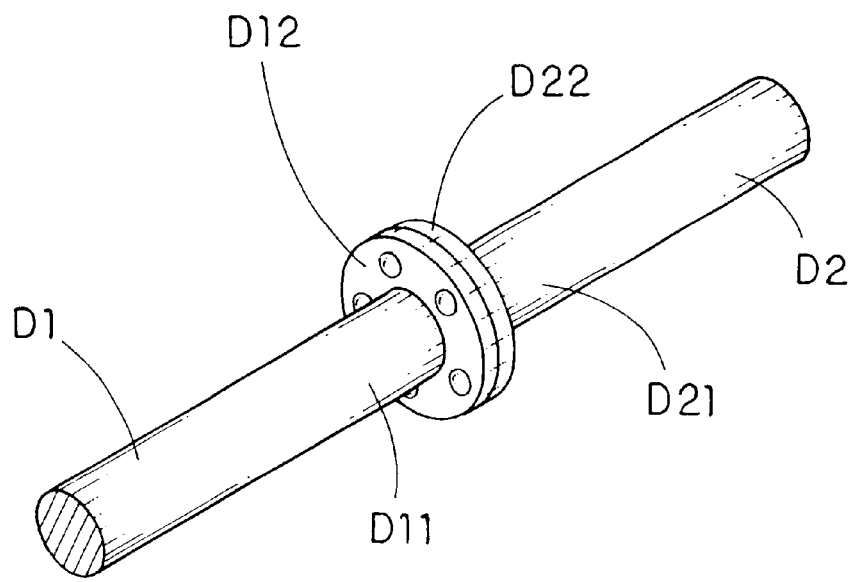
Figure 2:
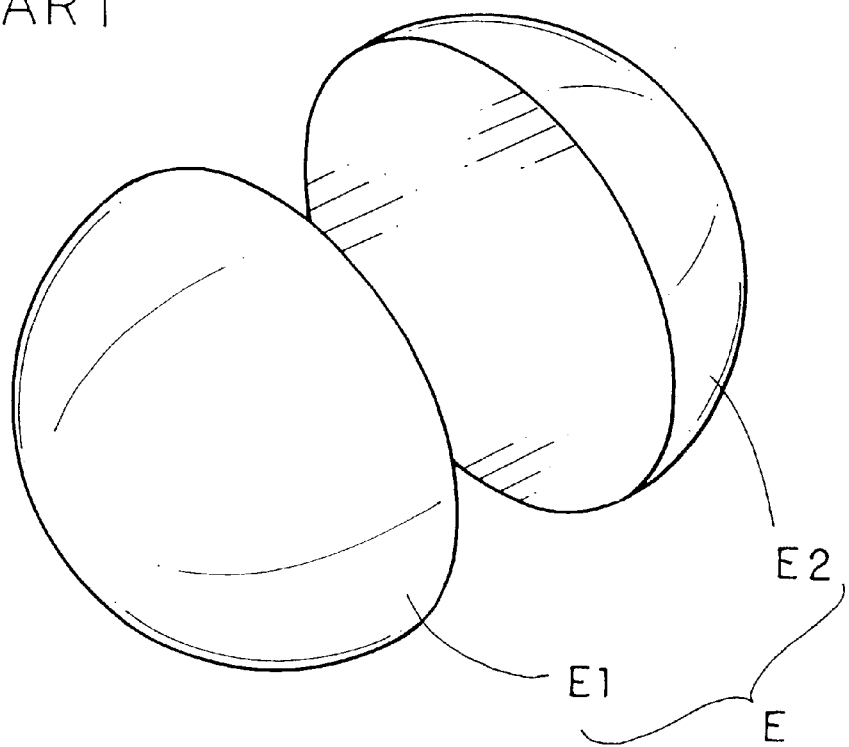
FIG. 2 is an exploded perspective view illustrating a conventional spheroid joined by two semi-spherical bodies.
Figures 3, 4:
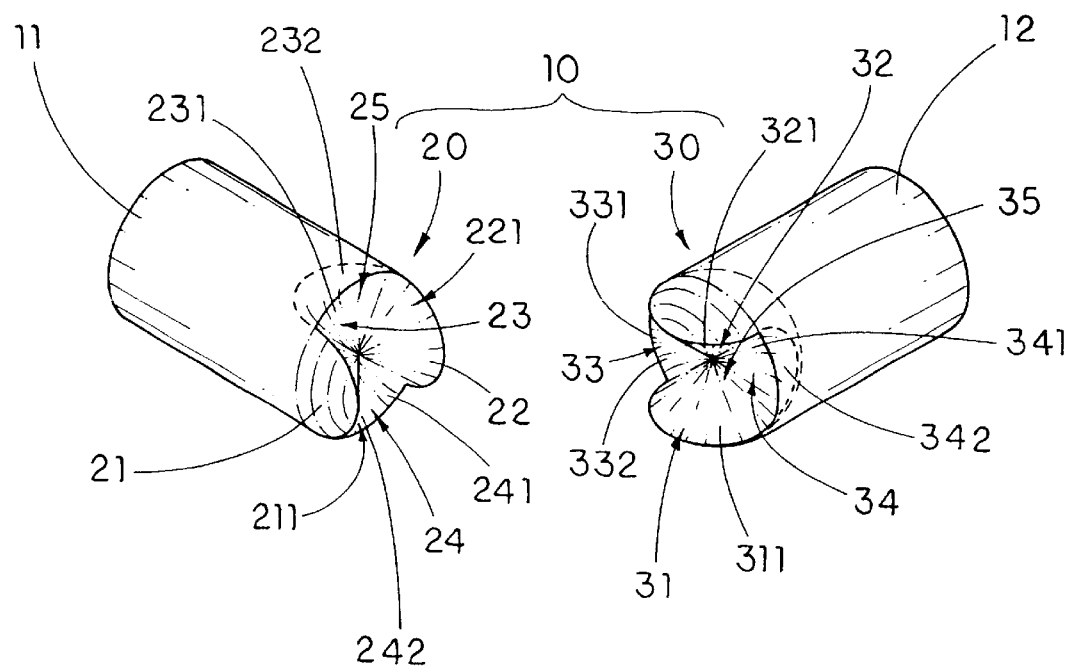
FIG. 3 is an exploded perspective view illustrating a symmetrical joint structure applied for connecting two beams coaxially according to a first preferred embodiment of the present invention.
FIG. 4 is a perspective view illustrating the united symmetrical joint structure according to the above first preferred embodiment of the present invention.
Figure 5:
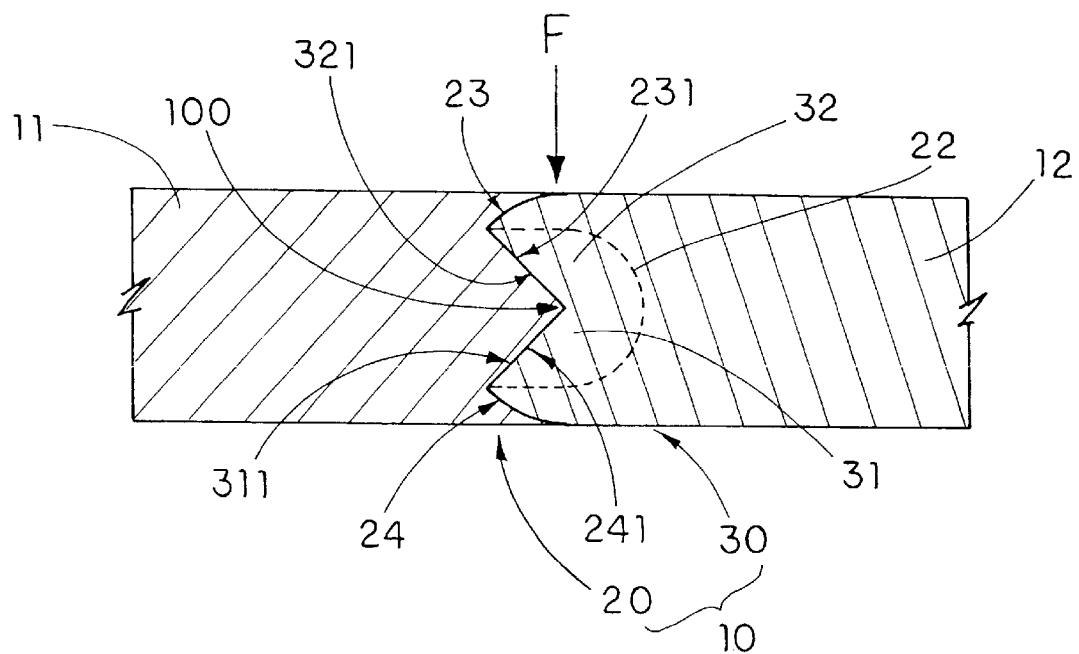
FIG. 5 is a sectional view of the united symmetrical joint structure according to the above first preferred embodiment of the present invention.

Referring to FIGS. 3 to 5, a symmetrical joint structure 10 according to a first preferred embodiment of the present invention is illustrated, which is adapted for integrally joining a first joint element 11 and a second joint element 12 together.

The first joint element 11 has a first joint portion 20 which comprises two identical first semi-conical engagement tongues 21, 22 symmetrically projecting at two sides thereof so as to define two identical first semi-conical engagement grooves 23, 24 symmetrically indented between the two first semi-conical engagement tongues 21, 22.

The two first semi-conical engagement tongues 21, 22 respectively define two first conically curved tongue surfaces 211, 221 symmetrically facing with each other, and the two first semi-conical engagement grooves 23, 24 respectively define two first conically curved groove surfaces 231, 241 symmetrically and continuously extended between the two first conically curved tongue surfaces 211, 221 so as to form a continuous first joint surface 25 for the first joint portion 20.

The second joint element 12 has a second joint portion 30 which comprises two identical second semi-conical engagement tongues 31, 32 symmetrically projecting at two sides thereof so as to define two identical second semi-conical engagement grooves 33, 34 symmetrically indented between the two second semi-conical engagement tongues 31, 32.

The two second semi-conical engagement tongues 31, 32 respectively define two second conically curved tongue surfaces 311, 321 symmetrically facing with each other, and the two second semi-conical engagement grooves 33, 34 respectively define two second conically curved groove surfaces 331, 341 symmetrically and continuously extended between the two second conically curved tongue surfaces 311, 321 so as to form a continuous second joint surface 35 for the second joint portion 30.

Moreover, a cone height of each of the first and second semi-conical engagement tongues 21, 22, 31, 32 is equal to a cone height of each of the first and second semi-conical engagement grooves 23, 24, 33, 34, and thus the size and shape of the first joint portion 20 and the second joint portion 30 are identical and symmetrical, so that the two second semi-conical engagement tongues 31, 32 are fittingly engaged in the two first semi-conical engagement grooves 23, 24 respectively while the two first semi-conical engagement tongues 21, 22 are fittingly engaged in the two second semi-conical engagement grooves 33, 34 respectively, so as to integrally united the first joint portion 20 and the second joint portion 30 together to form the symmetrical joint structure 10.

According to the first embodiment of the present invention, both the first and second joint elements 11, 12 are cylindrical beams having the same diameter while the symmetrical joint structure 10 is also embodied with the same diameter, so that after the first and second joint elements 11, 12 are coaxially connected together by the symmetrical joint structure 10, the first and second joint elements 11, 12 form an elongated beam as shown in FIGS. 4 and 5. In which, the cone height the first and second semi-conical engagement tongues 21, 22, 31, 32 and the first and second semi-conical engagement grooves 23, 24, 33, 34 is equal to the radius of the first and second joint elements 11, 12. Moreover, two first edge lips 232, 242 and two second edge lips 332, 342 are outwardly extended at the two first semi-conical engagement grooves 23, 24 and the two second semi-conical engagement grooves 33, 34 respectively, so as to cover the curved outer surfaces of the first and second semi-conical engagement tongues 31, 32, 21, 22 respectively.

As shown in FIGS. 4 and 5, simply applying an axial pressure to push first and second joint elements 11, 12 towards each other, the first and second joint portions 20, 30 will be firmly joined together to form the symmetrical joint structure 10 for coaxially connecting the first and second joint elements 11, 12 together, wherein the first joint surface 25 and the second joint surface 35 are fittingly met with each other. Since the first and second joint portions 20, 30 share a common center point 100 and all contacting surfaces of the first and second joint portions 20, 30 are curved and smooth surfaces extended outwardly and radically from the center point 100 to the circumference of the symmetrical joint structure 10, the first joint portion 20 is intercrossed with the second joint portion that the first and second semi-conical engagement tongues 21, 22, 31, 32 are respectively engaged in the first and second semi-conical engagement grooves 23, 24, 33, 34 with maximum contact surface area therebetween, so as to symmetrically unite with each other to form an integral body especially adapted for transmitting rotation force.

Moreover, each of the first and second semi-conical engagement tongues 21, 22, 31, 32 is embraced by the respective first and second semi-conical engagement grooves 23, 24, 33, 34, so that all the inclined engaging surfaces contacting between the first and second joint portions 20, 30 mutually support with each other in all directly except the separating force applied to axially pull the first and second joint elements 11, 12 apart from each other. In other words, if the first and second joint elements 11, 12 are supported between limited space distance that equal to the total length of the first and second joint elements 11, 12, even a radial force F applied downwardly towards the symmetrical joint structure 10 will still support the downward force F like a whole piece beam, as shown in FIG. 5. Therefore, such symmetrical joint structure 10 is especially adapted to be used in civil construction such as connecting support beams of a building or a bridge. For consumer product construction, adhesive may be applied to the first and second joint surfaces 25, 35 to bond the first and second joint portions 20, 30 together for resisting any axial pulling force to separate them apart. Of course, as bolts, screws, rivets or pins can be other alternative connecting elements.

Figure 6:
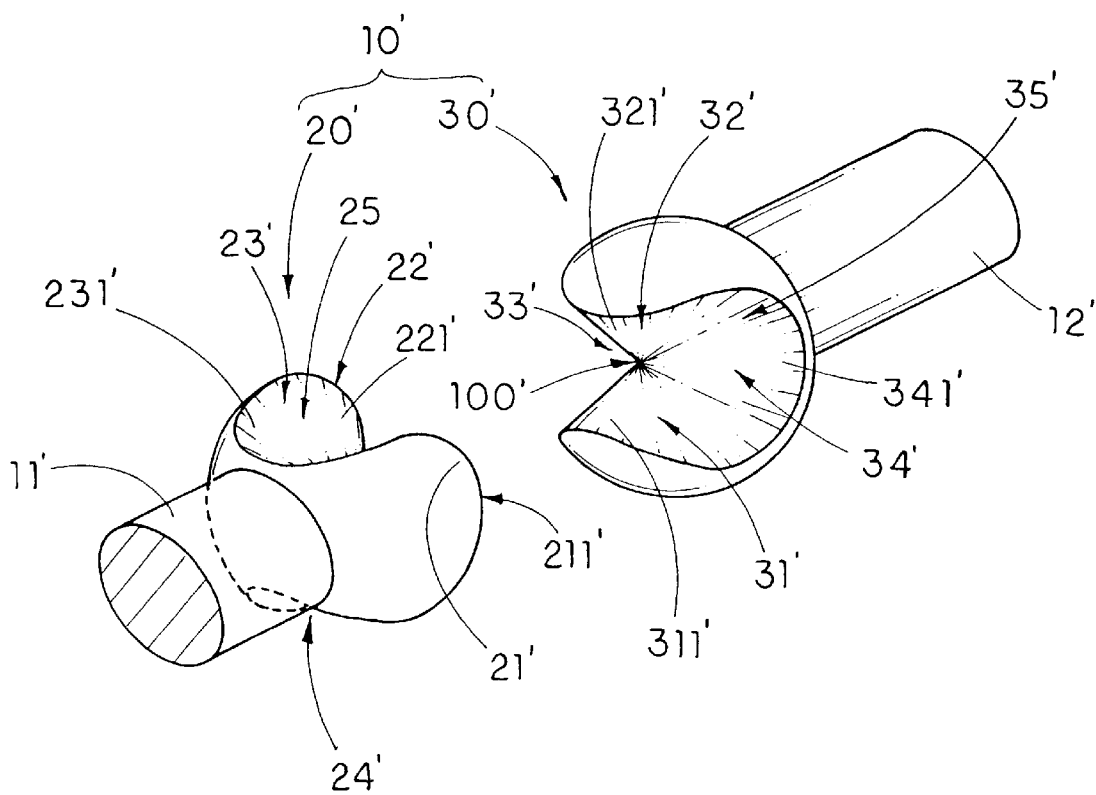
FIG. 6 is an exploded perspective view of an alternative mode of the symmetrical joint structure according to the above first preferred embodiment of the present invention.
Figure 7:
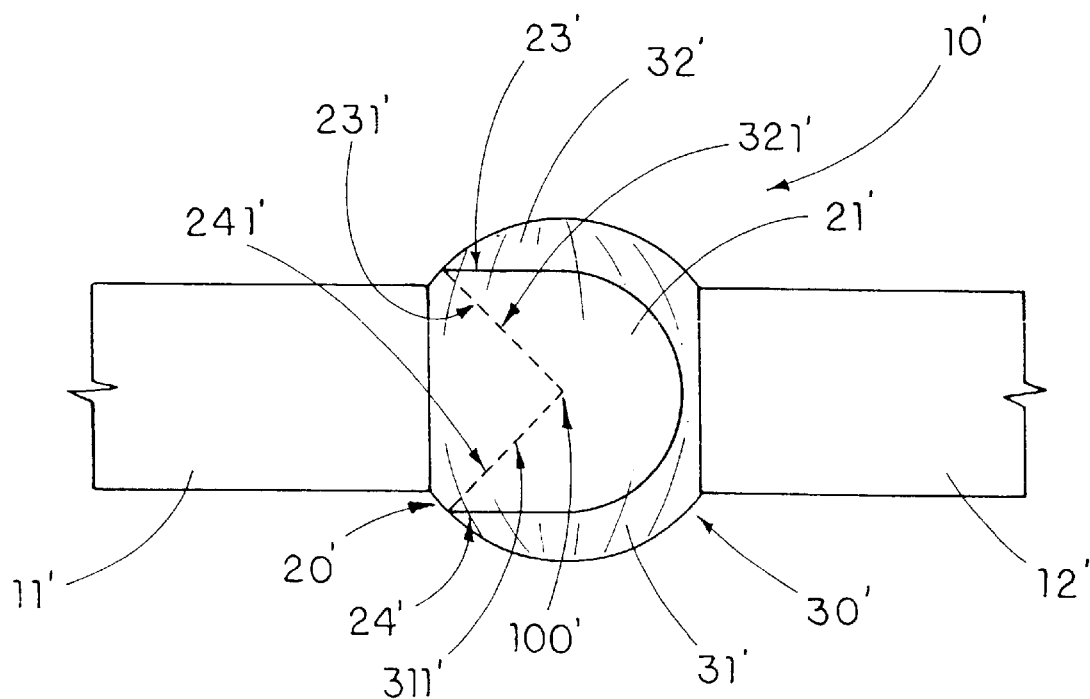
FIG. 7 is a front view of the symmetrical joint structure of the alternative mode of the above first preferred embodiment of the present invention.

Referring to FIGS. 6 and 7, an alternative mode of the above first preferred embodiment of the present invention is illustrated, wherein the symmetrical joint structure 10' is in ball structure while the first and second joint elements 11', 12' reduce their diameter to equal to or less than a radius of the ball structure of the symmetrical joint structure 10'. Structurally and functionally, the symmetrical joint structure 10' of this alternative mode is identical to that of the first preferred embodiment to comprise a first joint portion 20' and a second joint portion 30' integrally united together, except that the first and second edge lips 232, 242, 332, 343 of the first preferred embodiment are eliminated, so as to enable the first and second joint portions 20', 30' combined to form a ball shaped symmetrical joint structure 10'.

Similarly, according to the alternative mode of the above first embodiment, the first joint portion 20' also comprises two identical first semi-conical engagement tongues 21', 22' symmetrically projecting at two sides thereof so as to define two identical first semi-conical engagement grooves 23', 24' symmetrically indented between the two first semi-conical engagement tongues 21', 22'. The two first semi-conical engagement tongues 21', 22' respectively define two first conically curved tongue surfaces 211', 221' symmetrically facing with each other, and the two first semi-conical engagement grooves 23', 24' respectively define two first conically curved groove surfaces 231', 241' symmetrically and continuously extended between the two first conically curved tongue surfaces 211', 221' so as to form a continuous first joint surface 25' for the first joint portion 20'.

The second joint portion 30' also comprises two identical second semi-conical engagement tongues 31', 32' symmetrically projecting at two sides thereof so as to define two identical second semi-conical engagement grooves 33', 34' symmetrically indented between the two second semi-conical engagement tongues 31', 32'. The two second semi-conical engagement tongues 31', 32' respectively define two second conically curved tongue surfaces 311', 321' symmetrically facing with each other, and the two second semi-conical engagement grooves 33', 34' respectively define two second conically curved groove surfaces 331', 341' symmetrically and continuously extended between the two second conically curved tongue surfaces 311', 321' so as to form a continuous second joint surface 35' for the second joint portion 30.

Also, a cone height of each of the first and second semi-conical engagement tongues 21', 22', 31', 32' is equal to a cone height of each of the first and second semi-conical engagement grooves 23', 24', 33', 34', and thus the size and shape of the first joint portion 20' and the second joint portion 30' are identical and symmetrical, so that the two second semi-conical engagement tongues 31', 32' are fittingly engaged in the two first semi-conical engagement grooves 23', 24' respectively while the two first semi-conical engagement tongues 21', 22' are fittingly engaged in the two second semi-conical engagement grooves 33', 34' respectively, so as to integrally united the first joint portion 20' and the second joint portion 30' together to form the symmetrical joint structure 10'.

Like the above first preferred embodiment, simply applying an axial pressure to push first and second joint elements 11', 12' towards each other, the first and second joint portions 20', 30' will be firmly joined together to form the symmetrical joint structure 10' for coaxially connecting the first and second joint elements 11', 12' together, wherein the first joint surface 25' and the second joint surface 35' are fittingly met with each other. Since the first and second joint portions 20', 30' share a common center point 100' and all contacting surfaces of the first and second joint portions 20', 30' are curved and smooth surfaces extended outwardly and radically from the center point 100' to the circumference of the symmetrical joint structure 10', the first joint portion 20' is intercrossed with the second joint portion that the first and second semi-conical engagement tongues 21', 22', 31', 32' are respectively engaged in the first and second semi-conical engagement grooves 23', 24', 33', 34' with maximum contact surface area therebetween.

Figure 8:
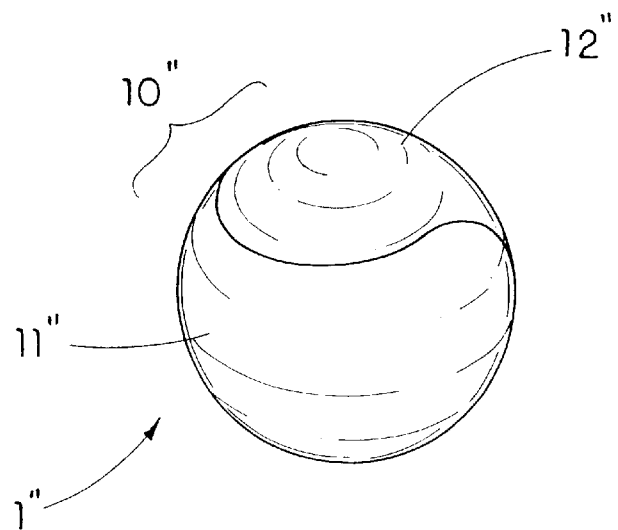
FIG. 8 is a perspective view of a symmetrical joint structure according to a second preferred embodiment of the present invention.
Figure 9:
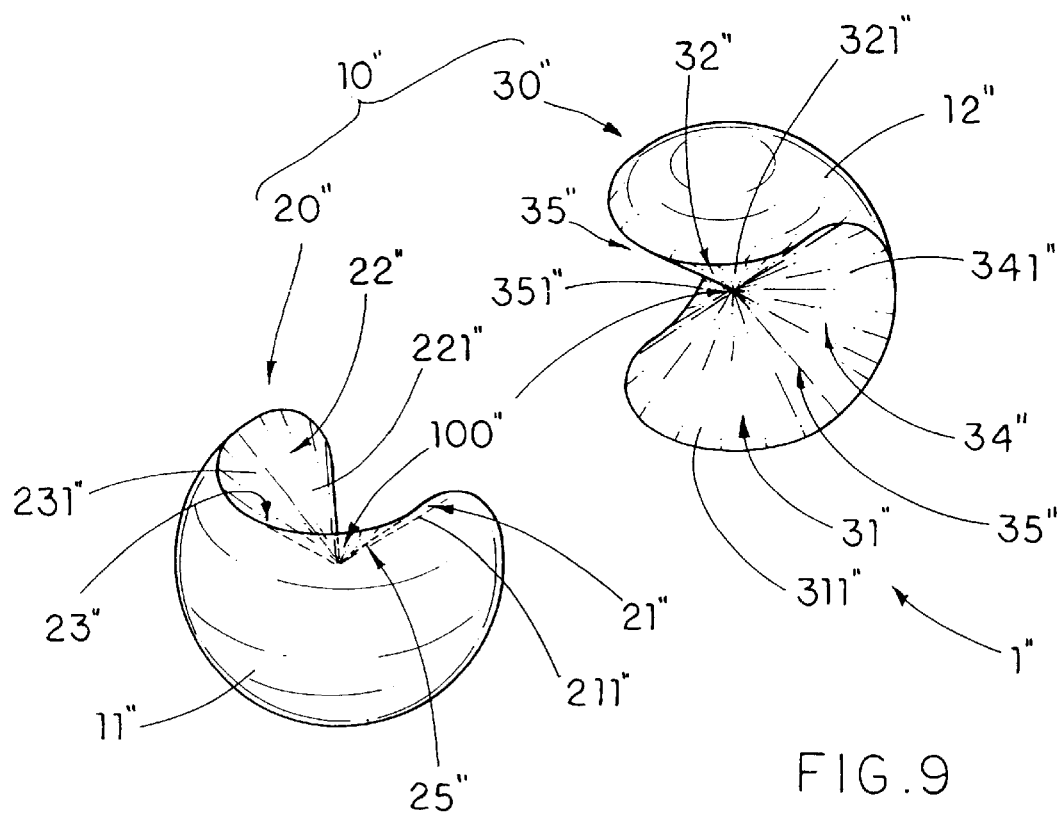
FIG. 9 is an exploded perspective view of the symmetrical joint structure according to the above second preferred embodiment of the present invention.

Referring to FIGS. 8 and 9, a symmetrical joint structure 10" according to a second preferred embodiment of the present invention is illustrated, which is adapted for integrally joining a first joint element 11" and a second joint element 12" together to form a spheroid 1", as shown in FIG. 8, instead of the elongated beam as shown in FIGS. 1 to 7 of the above first preferred embodiment.

Similar to the above first embodiment, the first joint element 11" has a first joint portion 20" which comprises two identical first semi-conical engagement tongues 21", 22" symmetrically projecting at two sides thereof so as to define two identical first semi-conical engagement grooves 23", 24" symmetrically indented between the two first semi-conical engagement tongues 21", 22". The two first semi-conical engagement tongues 21", 22" respectively define two first conically curved tongue surfaces 211", 221" symmetrically facing with each other, and the two first semi-conical engagement grooves 23", 24" respectively define two first conically curved groove surfaces 231", 241" symmetrically and continuously extended between the two first conically curved tongue surfaces 211", 221" so as to form a continuous first joint surface 25" for the first joint portion 20".

Similarly, the second joint element 12" has a second joint portion 30" which comprises two identical second semi-conical engagement tongues 31", 32" symmetrically projecting at two sides thereof so as to define two identical second semi-conical engagement grooves 33", 34" symmetrically indented between the two second semi-conical engagement tongues 31", 32". The two second semi-conical engagement tongues 31", 32" respectively define two second conically curved tongue surfaces 311", 321" symmetrically facing with each other, and the two second semi-conical engagement grooves 33", 34" respectively define two second conically curved groove surfaces 331", 341" symmetrically and continuously extended between the two second conically curved tongue surfaces 311", 321" so as to form a continuous second joint surface 35" for the second joint portion 30".

Also, a cone height of each of the first and second semi-conical engagement tongues 21", 22", 31 ", 32" is equal to a cone height of each of the first and second semi-conical engagement grooves 23", 24", 33", 34", i.e. the radius of the spheroid 1" to be united. Thus, the size and shape of the first joint portion 20" and the second joint portion 30" are identical and symmetrical, so that the two second semi-conical engagement tongues 31", 32" are fittingly engaged in the two first semi-conical engagement grooves 23", 24" respectively while the two first semi-conical engagement tongues 21", 22" are fittingly engaged in the two second semi-conical engagement grooves 33", 34" respectively, so as to integrally united the first joint portion 20" and the second joint portion 30" together to form the symmetrical joint structure 10".

Figure 10:
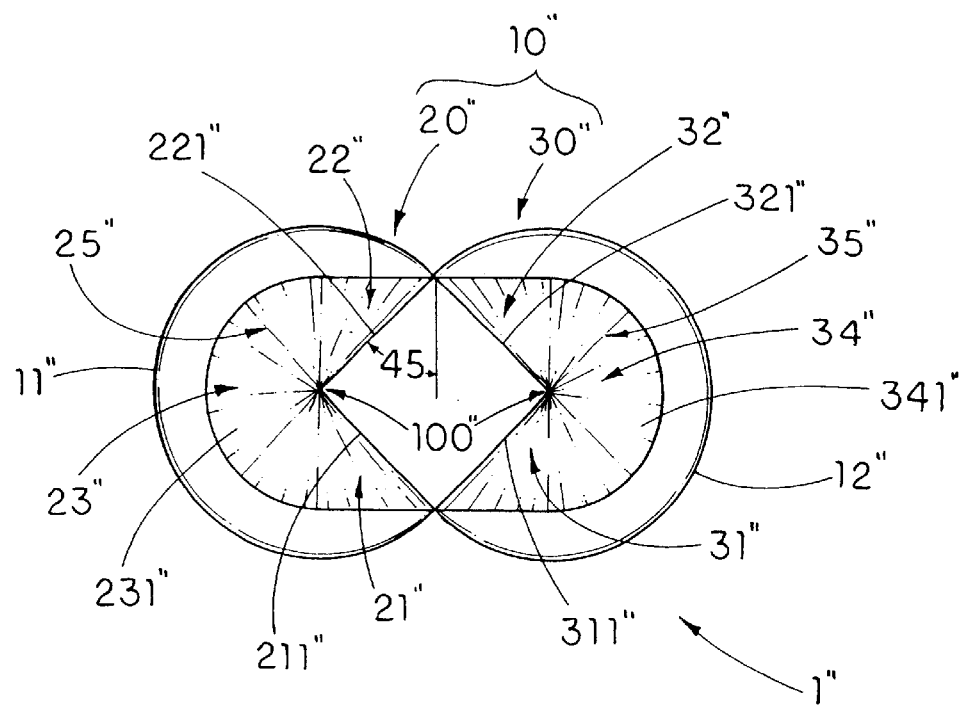
FIG. 10 illustrates the side views of the first and second joint elements of the symmetrical joint structure according to the above second preferred embodiment of the present invention.
Figure 11A:
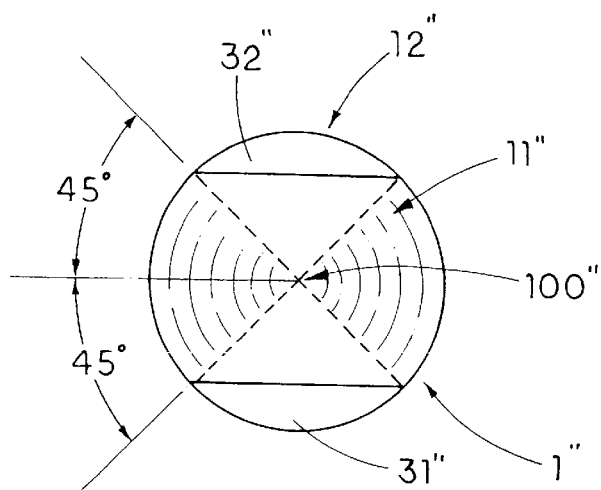
FIG. 11A is a front view of the symmetrical joint structure according to the above second preferred embodiment of the present invention.
Figure 11B:
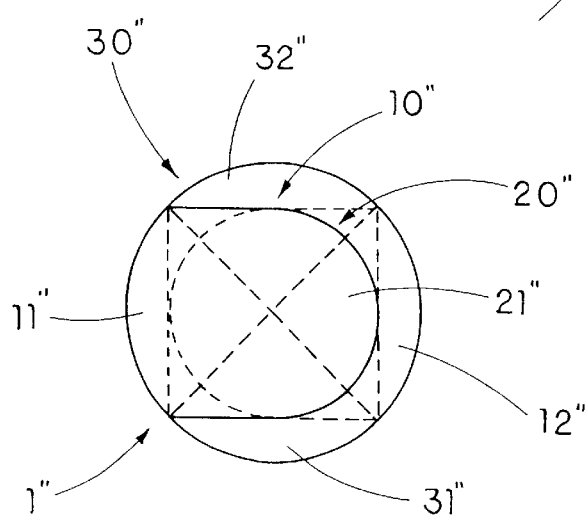
FIG. 11B is a side view of the symmetrical joint structure according to the above second preferred embodiment of the present invention.
Figure 11C:
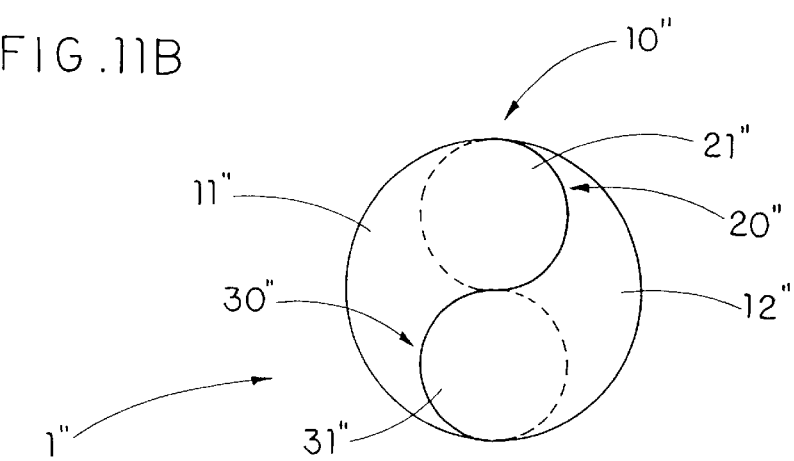
FIG. 11C is a schematic view illustrating how the first and second joint elements united together according to the above second preferred embodiment of the present invention.

As shown in FIG. 10, the first and the second joint elements 11", 12" are separated and shown in edge to edge condition so as to illustrate their symmetrical shapes, wherein the four tip edges of the two first conically curved tongue surfaces 211", 221" and the two second conically curved tongue surfaces 311", 321" forms a square space having a side equal to a radius of the spheroid 1" formed by joining the first and second joint elements 11", 12" together.

As shown in FIGS. 10, 11A, 11B, and 11C, it is worth to indicate that the four first and second conically curved tongue surfaces 211", 221", 311", 321 and the four first and second conically curved groove surfaces 231", 241", 331", 341" are extended from a geometrical center of each of the first and second joint elements 11", 12" outwardly at 45°. When we need to combine two different materials symmetrically to form a ball structure, such as a golf ball core or other biological matters, such spheroid 1" as disclosed above is a perfect joint structure to be used.

In order to form the first joint portion 20" for the first joint element 11" or the second joint portions 30" for the second joint element 12", two cone holes can be drilled at two opposing end of a sphere body coaxially to form the two semi-conical engagement grooves, wherein the cone height of each cone hole must be equal to the radius of the sphere body. Then, form a continuous groove extended between the two cone holes so as to define the two semi-conical engagement tongues projected between the two semi-conical engagement grooves. Thus, the first and second joint elements 11", 12", which are made in this way and have an identical shape and size, are capable of joining together to form the spheroid 1" as shown in FIG. 8.

It is worth to mention again that, as shown in FIGS. 8, 9, 11B, and 11C, simply applying an axial pressure to push first and second joint elements 11", 12" towards each other, the first and second joint portions 20", 30" will be firmly joined together to form the symmetrical joint structure 10" for coaxially connecting the first and second joint elements 11", 12" together to form the spheroid 1", wherein the first joint surface 25" and the second joint surface 35" are also fittingly met with each other.

Again, since the first and second joint portions 20", 30" share the common center point 100" and all contacting surfaces of the first and second joint portions 20", 30" are curved and smooth surfaces extended outwardly and radically at 45° from the center point 100" to the circumference of the symmetrical joint structure 10", the first joint portion 20" is intercrossed with the second joint portion that the first and second semi-conical engagement tongues 21", 22", 31", 32" are respectively engaged in the first and second semi-conical engagement grooves 23", 24", 33", 34" with maximum contact surface area therebetween, so as to symmetrically unite with each other to form the spheroid 1", wherein each of the first and second semi-conical engagement tongues 21", 22", 31", 32" is embraced by the respective first and second semi-conical engagement grooves 23", 24", 33", 34", so that all the 45° inclined engaging surfaces contacting between the first and second joint portions 20", 30" mutually support with each other in all directly. When adhesive is applied to the first and second joint surfaces 25", 35", the first and second joint elements 11", 12" will be united to an integral spherical body, i.e. the spheroid 1", having minimized friction between the first and second joint surfaces 25", 35" and minimized stress in the first and second joint portions 20", 30" during rotation and impacts.

It is worth to mention that, based on the disclosure above, it is apparent to develop various alternative or modified applications for the symmetrical joint structure of the present invention. In other words, no matter the symmetrical joint structure as claimed in the present invention is applied to join whatever two physical matters together, it should be considered as within the scope of the present claimed invention.

What is claimed is:

1. A symmetrical joint structure for joining a first joint element and a second joint element together, comprising:

a first joint portion provided on said first joint element, comprising two identical first semi-conical engagement tongues symmetrically projecting at two sides thereof so as to define two identical first semi-conical engagement grooves symmetrically indented between said two first semi-conical engagement tongues, wherein said two first semi-conical engagement tongues respectively define two first conically curved tongue surfaces symmetrically facing with each other, and said two first semi-conical engagement grooves respectively define two first conically curved groove surfaces symmetrically and continuously extended between said two first conically curved tongue surfaces so as to form a continuous first joint surface for said first joint portion; and a second joint portion provided on said second joint element, comprising two identical second semi-conical engagement tongues symmetrically projecting at two sides thereof so as to define two identical second semi-conical engagement grooves symmetrically indented between said two second semi-conical engagement tongues, wherein said two second semi-conical engagement tongues respectively define two second conically curved tongue surfaces symmetrically facing with each other, and said two second semi-conical engagement grooves respectively define two second conically curved groove surfaces symmetrically and continuously extended between said two second conically curved tongue surfaces so as to form a continuous second joint surface for said second joint portion;

wherein, a cone height of each of said first and second semi-conical engagement tongues is equal to a cone height of each of said first and second semi-conical engagement grooves and thus said size and shape of said first joint portion and said second joint portion are identical and symmetrical, so that said two second semi-conical engagement tongues are fittingly engaged in said two first semi-conical engagement grooves respectively while said two first semi-conical engagement tongues are fittingly engaged in said two second semi-conical engagement grooves respectively, so as to integrally united said first joint portion and said second joint portion together to form said symmetrical joint structure.

2. The symmetrical joint structure, as recited claim 1, wherein said first and second joint elements are two beams.

3. The symmetrical joint structure, as recited in claim 2, wherein said diameter of said first and second joint elements is equal to said symmetrical joint structure, thereby said first and second joint elements are joined together to form an elongated beam.

4. The symmetrical joint structure, as recited in claim 2, wherein said diameter of said first and second joint elements is smaller than a diameter of said symmetrical joint structure.

5. The symmetrical joint structure, as recited in claim 1, wherein said first and second joint elements joined together to form a spheroid.

6. The symmetrical joint structure, as recited in claim 1, wherein a cone height of said first and second semi-conical engagement tongues and said first and second semi-conical engagement grooves is equal to a radius of said first and second joint portions.

7. The symmetrical joint structure, as recited in claim 2, wherein a cone height of said first and second semi-conical engagement tongues and said first and second semi-conical engagement grooves is equal to a radius of said first and second joint portions.

8. The symmetrical joint structure, as recited in claim 3, wherein a cone height of said first and second semi-conical engagement tongues and said first and second semi-conical engagement grooves is equal to a radius of said first and second joint portions.

9. The symmetrical joint structure, as recited in claim 4, wherein a cone height of said first and second semi-conical engagement tongues and said first and second semi-conical engagement grooves is equal to a radius of said first and second joint portions.

10. The symmetrical joint structure, as recited in claim 5, wherein a cone height of said first and second semi-conical engagement tongues and said first and second semi-conical engagement grooves is equal to a radius of said first and second joint portions.

11. The symmetrical joint structure, as recited in claim 8, wherein two first edge lips and two second edge lips are outwardly extended at said two first semi-conical engagement grooves and said two second semi-conical engagement grooves respectively, so as to cover curved outer surfaces of said first and second semi-conical engagement tongues respectively.

12. The symmetrical joint structure, as recited in claim 1, wherein said first and second joint portions share a common center point and all said first and second conically curved tongue surfaces and said first and second conically curved groove surfaces of said first and second joint portions are curved and smooth surfaces extended outwardly and radically from said center point to said circumference of said symmetrical joint structure, wherein said first joint portion is intercrossed with said second joint portion that said first and second semi-conical engagement tongues are respectively engaged in said first and second semi-conical engagement grooves, and each of said first and second semi-conical engagement tongues is embraced by said respective first and second semi-conical engagement grooves.

13. The symmetrical joint structure, as recited in claim 6, wherein said first and second joint portions share a common center point and all said first and second conically curved tongue surfaces and said first and second conically curved groove surfaces of said first and second joint portions are curved and smooth surfaces extended outwardly and radically from said center point to said circumference of said symmetrical joint structure, wherein said first joint portion is intercrossed with said second joint portion that said first and second semi-conical engagement tongues are respectively engaged in said first and second semi-conical engagement grooves, and each of said first and second semi-conical engagement tongues is embraced by said respective first and second semi-conical engagement grooves.

14. The symmetrical joint structure, as recited in claim 7, wherein said first and second joint portions share a common center point and all said first and second conically curved tongue surfaces and said first and second conically curved groove surfaces of said first and second joint portions are curved and smooth surfaces extended outwardly and radically from said center point to said circumference of said symmetrical joint structure, wherein said first joint portion is intercrossed with said second joint portion that said first and second semi-conical engagement tongues are respectively engaged in said first and second semi-conical engagement grooves, and each of said first and second semi-conical engagement tongues is embraced by said respective first and second semi-conical engagement grooves.

15. The symmetrical joint structure, as recited in claim 8, wherein said first and second joint portions share a common center point and all said first and second conically curved tongue surfaces and said first and second conically curved groove surfaces of said first and second joint portions are curved and smooth surfaces extended outwardly and radically from said center point to said circumference of said symmetrical joint structure, wherein said first joint portion is intercrossed with said second joint portion that said first and second semi-conical engagement tongues are respectively engaged in said first and second semi-conical engagement grooves, and each of said first and second semi-conical engagement tongues is embraced by said respective first and second semi-conical engagement grooves.

16. The symmetrical joint structure, as recited in claim 9, wherein said first and second joint portions share a common center point and all said first and second conically curved tongue surfaces and said first and second conically curved groove surfaces of said first and second joint portions are curved and smooth surfaces extended outwardly and radically from said center point to said circumference of said symmetrical joint structure, wherein said first joint portion is intercrossed with said second joint portion that said first and second semi-conical engagement tongues are respectively engaged in said first and second semi-conical engagement grooves, and each of said first and second semi-conical engagement tongues is embraced by said respective first and second semi-conical engagement grooves.

17. The symmetrical joint structure, as recited in claim 10, wherein said first and second joint portions share a common center point and all said first and second conically curved tongue surfaces and said first and second conically curved groove surfaces of said first and second joint portions are curved and smooth surfaces extended outwardly and radically from said center point to said circumference of said symmetrical joint structure, wherein said first joint portion is intercrossed with said second joint portion that said first and second semi-conical engagement tongues are respectively engaged in said first and second semi-conical engagement grooves, and each of said first and second semi-conical engagement tongues is embraced by said respective first and second semi-conical engagement grooves.

18. The symmetrical joint structure, as recited in claim 11, wherein said first and second joint portions share a common center point and all said first and second conically curved tongue surfaces and said first and second conically curved groove surfaces of said first and second joint portions are curved and smooth surfaces extended outwardly and radically from said center point to said circumference of said symmetrical joint structure, wherein said first joint portion is intercrossed with said second joint portion that said first and second semi-conical engagement tongues are respectively engaged in said first and second semi-conical engagement grooves, and each of said first and second semi-conical engagement tongues is embraced by said respective first and second semi-conical engagement grooves.

19. The symmetrical joint structure, as recited in claim 12, wherein said first and second conically curved tongue surfaces and said first and second conically curved groove surfaces of said first and second joint portions are curved and smooth surfaces are inclined from said center point at 45°.

20. The symmetrical joint structure, as recited in claim 13, wherein said first and second conically curved tongue surfaces and said first and second conically curved groove surfaces of said first and second joint portions are curved and smooth surfaces are inclined from said center point at 45°.

21. The symmetrical joint structure, as recited in claim 14, wherein said first and second conically curved tongue surfaces and said first and second conically curved groove surfaces of said first and second joint portions are curved and smooth surfaces are inclined from said center.

22. The symmetrical joint structure, as recited in claim 15, wherein said first and second conically curved tongue surfaces and said first and second conically curved groove surfaces of said first and second joint portions are curved and smooth surfaces are inclined from said center.

23. The symmetrical joint structure, as recited in claim 16, wherein said first and second conically curved tongue surfaces and said first and second conically curved groove surfaces of said first and second joint portions are curved and smooth surfaces are inclined from said center.

24. The symmetrical joint structure, as recited in claim 17, wherein said first and second conically curved tongue surfaces and said first and second conically curved groove surfaces of said first and second joint portions are curved and smooth surfaces are inclined from said center.

25. The symmetrical joint structure, as recited in claim 18, wherein said first and second conically curved tongue surfaces and said first and second conically curved groove surfaces of said first and second joint portions are curved and smooth surfaces are inclined from said center.

* * * * *